United States Patent [19]

Lewandowski et al.

[11] Patent Number: 4,865,975
[45] Date of Patent: Sep. 12, 1989

[54] PROCESS FOR RECUPERATION OF THE PROTEINS LOST BY THE DAIRY INDUSTRY

[76] Inventors: Raymond Lewandowski; Sylvette Lewandowski, both of 3100 Duplessis Road, Fleurimont, Canada, J1H 5H3

[21] Appl. No.: 932,665

[22] Filed: Nov. 20, 1986

[51] Int. Cl.⁴ .................................................. C12P 21/06
[52] U.S. Cl. ..................................... 435/69; 435/262; 435/853
[58] Field of Search .................... 435/69, 262, 853

[56] References Cited

U.S. PATENT DOCUMENTS 4,473,589 9/1984 Freeman et al. ...................... 435/69

FOREIGN PATENT DOCUMENTS 777457 8/1962 Canada .
739946 8/1966 Canada .
808224 3/1969 Canada .

*Primary Examiner*—Barry S. Richman
*Assistant Examiner*—T. J. Wallen

[57] ABSTRACT

A process for the recuperation, in a form usable by Man, of the proteins present in the sullage of the dairy industry. This process is effected in a number of devices successively including a biological pre-neutralizing tank, in which the alcaine sullage is submitted to acidic fermentation and is freed from sand, a neutralizing reactor for a further acidification of this sullage by depositing natural zoogloea over the divided materials which are within the reactor, a flocculating device for coagulation of the proteins in the sullage in the shape of proteinic flakes under controlled pH conditions, and a floatation device in which the proteins are floated by microbubbles and gathered by scraping. A novel combined flocculation and floatation adjuvant is described; it increases the isoelectric pH, so as to decrease consumption of added acid and increase the flocculation pH range. This flocculation-floatation adjuvant comprises an organic co-adjuvant and a mineral co-adjuvant separately injected in the flocculation device. The proteins which are obtained are emulsified through oses. The final product of the process, which may be a powder, may be used inter alia in animal feeding, in the pharmaceutical industry and in the cosmetics industry.

15 Claims, 1 Drawing Sheet

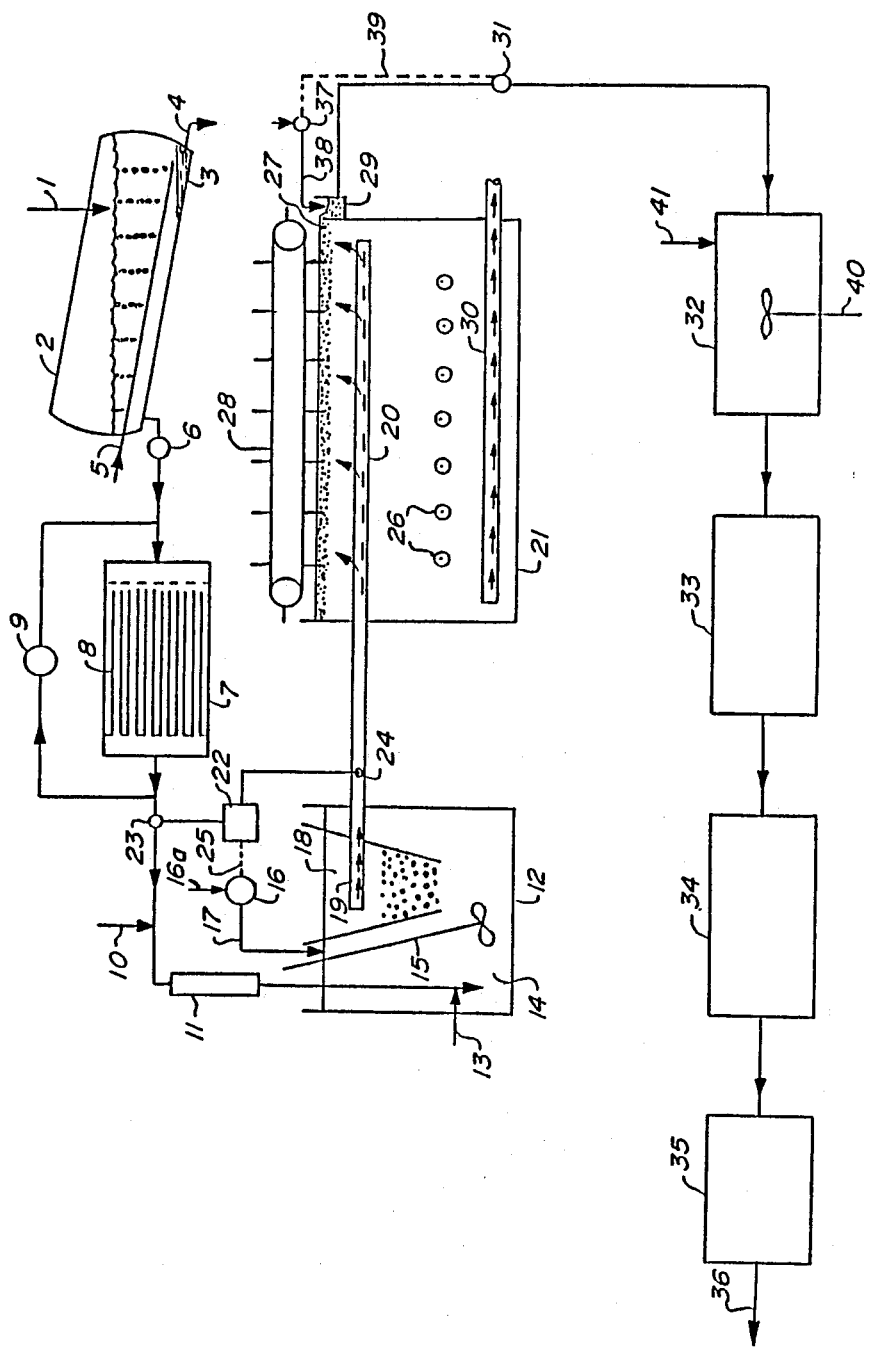

PROCESS FOR RECUPERATION OF THE PROTEINS LOST BY THE DAIRY INDUSTRY

FIELD OF THE INVENTION

The present invention relates to a process for recuperating the proteins lost by the dairy industry, and an apparatus thereof.

BACKGROUND OF THE INVENTION

Dairy products discharged into the sewer of a dairy plant generally represent from one to three percent of the total production, and even more, depending on the activities. These losses constitute an environmental contaminant which must nowadays be eliminated at high costs in a biological process, most often of the aerobic type. Elimination of the muds constitutes an important constraint in an aerobic biological process. In view of decreasing these costs, an attempt to subject the sullage proteins to a methane-generating pretreatment has been made. This process is not basically enticing, since proteins are substances which are too valuable to be downgraded to combustible state. Moreover, although it does decrease the cost of waste treatment, the methane-generating process has high fixed costs, which brings its total operating cost way above a redeemable threshold.

Conventional physico-chemical treatment of sullage is inadequate in the dairy industry, if one wishes to recycle the milky products as foodstuff, because of the nature of the chemical products involved. Amongst these products, aluminum and iron salts are normally found. Aluminum must be excluded because of the its toxicity to Man. Iron cannot be used in the dairy industry, because it has a destructive catalytic effect over the basic elements of milk. Furthermore, iron salts are not recommended for animal feeding, since they color the meat, thus decreasing its commercial value.

The cost of eliminating the metals contained in the muds generated by the conventional physico-chemical treatment is again prohibitive, and somehow or other, it cannot be completed but for concurrent downgrading of the associated organic compounds. The products that usually result from this treatment, due to their high relative mineral yield, do increase the ash content of the treated products, and this is not appreciated in the dairy business when this mineral yield does not entail a financial return. Reduction to powder of the treated product by spraying is impossible, since the metallic precipitates give to the treated product a heterogeneous granular structure which chokes the equipment and, more particularly, the spraying nozzles. Roll drying remains possible but the operating costs are high and clogging has to be closely controlled. The end product does not appear in the shape of a homogeneous powder, but in the form of particles or flakes, which are highly colored when iron salts have been used for the treatment. Because of its heterogeneity and of its lack of fluidity, further handling of the product, such as putting it into bags, is problematic. Under their own weight, the flakes cling with one each another to form a clod, and this may affect the whole production.

Utilization of metal-based reagents would not be the sole barrier for applying the conventional physico-chemical processes to the dairy industry. A further contraindication of conventional processes is that they entail the use of synthetic adjuvants, which are indispensable to prevent work-heavy treatment.

Indeed, should they be used for the dairy industry sullage treatment, these synthetic chemical products would be integrally found in the final milk products. Now, innocuousness of ingested synthetic organic adjuvants is not established, and it would be abusive to have them brought into our alimentary chains. It may be said that a few countries allow the use in the treatment of their drinking water of some synthetic adjuvants, although it must be understood that the adjuvants are not any more suitable to be present in treated water than the jointly-injected metal-based salts.

In conclusion, conventional physico-chemical processes cannot be applied in the profitable recycling of the dairy industry sullage, in view of the non-alimentary nature of the reagents used and of the fact that it is impossible to evaporate and dry out the recuperated dairy products.

OBJECTS OF THE INVENTION

The general object of the invention is to increase the efficiency of the dairy industry plants by introducing a process for recuperating the proteins contained in the dairy industry sullage, in a non-toxic form.

A corollary object is to economically eliminate the pollution generated by this sullage.

Another object of the invention is to recycle the proteins from the treatment process in accordance with the invention in a form usable by Man: for feeding, pharmaceutical products, cosmetics, etc.

Another object of the invention is to provide a process which will allow for the evaporation and drying of the recuperated proteins.

SUMMARY OF THE INVENTION

It was discovered in the present invention that it is possible to provide for regular and continuous recuperation of the proteins from milk-containing liquids such as the dairy industry sullage with products lacking any toxicity. It has been found on the other hand that it was possible to fluidify the recuperated proteins, so as to permit that they be concentrated and then dried.

In accordance with the process, the recuperated proteins may be either in a liquid state, or in a concentrated state, or in a powder state in view of their end use: animal feed, pharmaceutical industry, cosmetics industry, etc.

Sale of these recuperated proteins, in any form whatsoever, rapidly pays off the initial investment for the recuperation equipment.

In accordance with the process, the waters containing the sullage to be treated are first directed into a biological preneutralizing tank. It was found in accordance with the invention that this biological preneutralization tank must have a duration of sullage treatment, which may be between one and fifteen hours, at the normal average daily flow of these waste waters produced by the dairy industry. This tank must be oxygenated by air or pure oxygen injection, at a rate which may vary between 0.01 and 0.9 milligram of oxygen transferred to the liquid medium per milligram of Chemical Demand in Oxygen (CDO) and per hour, or mg $O_2$/mg CDO/h.

Dairy sullage has a temperature which may normally reach up to 50 degrees Celsius (°C.). In these conditions of temperature and microaerophily, acidic fermentations naturally occur in the tank and decrease the alkalinity of the sullage, under the phenol-phtalein test, within a range which may vary between 5 and 25 percent (%). The water level in the tank may also vary. Therefore the tank is used as a bio-chemical buffer tank for the auto-neutralization of the acids and alkali in the effluents and also as a hydraulic buffer tank. Yet, one should never completely empty it, so as to maintain a sufficient biomass of neutralizing micro-organisms. When the water used to wash the milk trucks are poured into the general sewer of the plant, the form and shape of the biological preneutralizing tank provide for decantation and removal of the earth or rock particles which might be present in the proteins. Toilet waters are not directed toward the protein recuperation chain.

In accordance with the invention, the biological neutralization of the waters is completed in a reactor sequentially following the preneutralizing tank, at a temperature which may reach 60° C. This reactor is constituted of a vat, interiorly provided by divided materials, being fixed or fluidized, such as spheres, cylinders, flat or wavy plates, or any other support having a developed surface which may vary between 10 and 250 square meters ($m^2$) per (cubic meter) $m^3$ of the reactor volume. It was also found in accordance with the invention that the stagnation period of the waters to be neutralized in the reactor must be within a range varying between half an hour to eight hours, and that the speed of the circulation of the water be within a range between 1.5 and 50 m/hour (h). This circulation is provided for by a recycling operation of the waters in a closed loop. A zoogloea develops at the surface of the divided materials contained in the reactor, and provides for a complementary fermentation which neutralizes up to acidification the circulating liquid. Depending on the nature of the sullage and on its concentration the circulating speed is empirically determined in the interval of 1.5 to 50 m/h, in such a way that there be automatic flushing of the reactor to prevent the natural zoogloea from reaching such a thickness whereby putrefactive fermentations would develop.

The water pH downstream from the reactor is about 5, and alkalinity under the methyl-orange test of these waters is no more than 5 to 15% that of the plant sullage. In order to accelerate the natural biological neutralization, and mainly the formation of zoogloea on the divided material of the reactor, the medium may be sowed by the injection in the preneutralization tank of acidic-inducing cultures, such as yogourt ferment.

After biological neutralization, the waters are directed toward a flocculating device where the proteins are flocculated by the injection of an acid to maintain the liquid at the isoelectric pH of the proteins of the specific waste waters being treated. This pH is generally somewhere in between 3.8 and 4.6, this interval narrowing to 4.0–4.2 for the majority of dairy plants. At this stage, flocculation may continue until the step of coagulation and may give rise to protein flakes visible to the naked eye. Yet most often the flakes are so small that the medium seems unchanged after injection of acid. These conditions are then unfavorable for the subsequent separation of the proteins by floatation, which operation is compulsory in the dairy industry, because of the presence of fats. nevertheless, even with well-constituted flakes, flake formation may not occur, since at the isoelectric pH, the Zeta potential of the flaked proteins may be incompatible with that one which surrounds the micro-bubbles used in the floatation process.

It was found in accordance with the invention that it was possible to recuperate the flaked proteins by floatation with a high and constant yield by injecting in the flocculating device a combined flocculation and floatation adjuvant constituted by two co-adjuvants separately injected: one is a mineral co-adjuvant chosen from the group consisting of calcium salts, magnesium salts and mixtures thereof, and the other one an organic co-adjuvant chosen from the group consisting of alginates, pectin, albumin agar-agar, gelatin, carob bean extract (*Ceratonia siliqua*), and mallowextract such as (such as *Malva Sylvestris, Malva rotundifolia* and *Malva Moschata*).

The doses of calcium salts and/or magnesium salts to be injected are about a few tens of parts per million, whereas the other (s) product (s) is (are) injected to a total dose of a few parts per million.

The synergistic effect in between these two co-adjuvants modifies the Zeta potentials, whereby the particlemicro-bubble cohesion is guaranteed up to the time when the floated proteins are scraped at the surface of the floatation device.

The role of the adjuvant is volantarily limited in time, so that the floated proteins become separated from the gas of the micro-bubbles pursuant to the scraping. The recuperated proteins hence lose their foamy structure and, hence, suitable for their subsequent treatment under vacuum, either by steam sterilization in an expansion chamber, or by evaporation. The adjuvant according to the invention has also the function of modifying the isoelectric pH towards a decrease of acid consumption, be it produced by the biological reactions generated at the upstream level, or brought up at the downstream end. For example, where floc-formation occurs only at pH 4,2 by the simple action of an acid, floc begins to appear as early as pH 4,7 when the adjuvant according to the invention has been anteriorly injected. Over and above the reduction in costs, there is thus a widening of the pH range of floc-forming, which facilitates the treating process. The adjuvant will be ineffective if it consists of aluminum salts or iron salts. Consequently, acids coming from the biological reactions, the make-up acid, the mineral and organic co-adjuvants must thus, according to the invention, form an inseparable association to be effective. Contrary to conventional adjuvants which are injected after the basic floc-forming substance, the adjuvant in accordance with the invention is injected first.

The relative properties of the constituents of the flocculation-floatation adjuvant varies widely with the type of dairyindustry. In some instances, the formulation may be reduced to a few components, but it is essential that at least one mineral constituent and at least one organic constituent enter this formulation. If, for example, the washing waters in the dairy plants contain phosphoric acid, it would be advisable that a calcium salt be involved in the formulation of the adjuvant in such a way as to precipitate the dicalcic phosphate to thereby ensure a partial dephosphatation of these waters.

The increased content of the recuperated proteins due to the presence of dicalcic phosphate must not be seen as a drawback, since the dicalcic phosphate is not here an inert substance but, on the contrary, a valued product sought in animal feeding, because it increases the commercial value of the recuperated proteins.

All the components of the flocculation-floatation adjuvant are edible and most of them are used daily in the production of alimentary products designed for human consumption.

The flocculation device according to the invention consists of two sections which are preferably distinct, but which may be assembled to form a single unit. The first section is provided with a lower medium-speed stirrer. It is in this section that all the treatment products are found. The second section is a stagnation zone where maturation of the proteinic aggregate occurs. This second section is constituted by a zone which widens from a narrow base to the free surface. The waters enter the zone bottom and their speed decrease as they rise. The proteinic aggregates become enlarged therein until a water-filtering bed is formed. A collector near the free water surface gathers the flocculated waters with the least turbulence in such a way as to retain the dimension and cohesiveness of the proteinic aggregates until they reach the floatation device. The stagnation time in the flocculation device is from 5 to 20 minutes (of which 40 to 75% for the first-stirred section and 25 to 60% for the second section, that is the contact section with a proteinic bed). The surface load in the contact section with a protein bed is comprised between 2 and 30 m/h.

pH regulation is provided for in the floatation device via two ph sensors connected to a pH meter provided with a device which combines the information coming from the two sensors, so as to produce a modulated resulting current which controls the output of the make-up acid-feed pump.

The first sensor is installed at the input of the first section of the flocculation device, whereas the second sensor is installed at the output of the second section of the flocculation device. This pH regulator ensures a guaranteed precise control notwithstanding the brutal alkalinity peaks due to manufacturing incidents or to the simultaneous caustic washings of several machines. After flocculation, the waters are fed into a floatation device where they are dispersed by a network of outlets located above the zone of micro-bubbles.

Two types of floatation device may be provided for the recuperation of proteins: the electrolytic floatation type and the air-floatation type, which works through release of water containing gases dissolved under pressure, mots often air. The advantage of electrolysis is to produce minute micro-bubbles which are generated by spaced-apart electrodes and which do not produce turbulence. In view of the permanent acidic vaccination of the medium, electrode-furring is not to be expected. If aerofloating is used, the release points of the pressurized water must be numerous, so as to prevent excessive turbulence.

During their scraping, the recuperated proteins have a virtual density of 0.5, but after scraping their density tends to increase toward 1, because of the release of the secluded gas. The dry extract of recuperated proteins may be as high as 23% by weight. At this concentration level, the product can be shovelled. However, a concentration of 9 to 10% is normally practised; at this concentration, the product is still fluid. The recuperated proteins, whatever their concentration is neither sterilizable, nor evaporable nor dryable, since they quickly choke the equipment. This is due to the granular nature of the milk proteins, the emulsion state of which has been disrupted by flocformation.

In accordance with a feature of the invention, the sterilization, the evaporation, and the drying steps have been made possible by emulsifying of the recuperated proteins by oses, more particularly lactose, the action of which is accelerated by the addition of a base, and by subjecting the proteins to heat.

The base is injected in such a way as to bring the pH back to about neutral zone. A final pH of 6.6 to 6.8, corresponding to 0° Dornic, is generally adequate.

The oses may be glucose, fructose, etc. . . . ; but the lactose is preferred, since it is widely available on the market. Lactoserum concentrated up to 50%, together with lactose-based products, are suitable. Lactose is added to the receuperated proteins in a way that the ratio of the weight of total Kjeldahl nitrogen in the recuperated products to the weight of total lactose present in the mix expressed as monohydrated lactose, is lower than 1.40. If the recuperated proteins are emulsified with other oses, either one or a mixture of such oses, this ratio will be: 504 x/M, where M is the average Molecular weight of the oses in the mixture and x a constant comprises between 0.6 and 1.4.

The mix of recuperated proteins and of the emulsifying ose (s) is made by stirring which facilitates reemulsion of the proteins. Between 4° and 25° C., the contact time of the products in the mix will be comprised between 3 minutes and 44 hours, depending on the time which has lapsed between coagulation and emulsification. Temperature increase strongly accelerates the process: after pasteurization at 80°–85° C. and evaporation until dryness of 35 to 40% by weight, stability of the proteins emulsion is established in a few minutes. Sterilization at a higher temperature leads to still faster results.

Emulsification according to the teachings of the invention makes sterilization of the recuperated proteins possible through ultra-violet radiation. After pasteurization or sterilization, the emulsified proteins may be used as liquid cattle feed. However, because of the high water ratio, the economic distance of the sale of the product is limited.

Drying is to be envisioned in order to increase this economic distance.

After drying, the recuperated proteins is a powder having a color which may vary from ivory, if the dairy plant exclusively manufactures skimmed milk, to cream if a cheesedairy is involved and utilizes colorants.

It is to be noted that, if the city's aqueduct water is colored by organic matters or by iron, this coloring will be found in the recuperated proteins which will lose some of their whiteness. However, in accordance with the process, it is recommended to use at the maximum cow waters in the plant, since, in addition to their absence of color, these waters lack alkalinity. The biological or alternate chemical neutralization is then facilitated together with the reduction of the operating costs.

DESCRIPTION OF THE DRAWING

The single figure is a schematic view of the complete sequence of the apparatuses for recuperating proteins as a powder.

DETAILED DESCRIPTION OF THE DRAWING

On this figure, the floatation apparatus is of the electrolysis type. The sullage or crude waters 1 are poured in a biological preneutralization tank 2, which is inclined, so that decantation of solid particles occurs simultaneously. These particles 3, which concentrate at the lowest point of the tank, are periodically flushed via tubing 4. The waters in the preneutralization tank are stirred by pressurized air from tubing 5. The waters poured in the tank 2 may have temperature peaks of up to 95° C. pursuant to high temperature flushings in the dairy plant. However, the tank 2 operates as a buffer tank and temperature is lowered by the evaporation which is subsequent to the air injection.

The preneutralized waters are sucked up by a constant flow pump 6 to be brought into a neutralization reactor 7 provided with divided materials 8, such as Raschig rings. A whirlpool is generated in this reactor at a desired speed of the waters by a recirculating pump 9, looped on the reactor 7.

After biological preneutralization, the waters receive a mineral co-adjuvant, being either a magnesium salt and/or a calcium salt injected through a tubing 10, and mixed by an in-line static mixer 11. Immediately before its admission in a flocculation device 12, the crude water receives the organic co-adjuvant, which is injected by a tubing 13.

The first section 14 of the flocculation device 12 is provided with a stirrer 15, and the make-up acid is fed at 16a to a control pump 16 which injects said acid through tubing 17 into section 14 on top of said section. The second section 18 of the coagulation device is shown as inserted within section 14. It is a frusto-conical container, the narrow open bottom of which is spaced above the bottom of first section 14.

The flocculated and coagulated waters, ready for floatation, are collected by the surface network 19 to be poured turbulence-free into the distributing network 20 of the floatation device 21.

A pH meter 22 is provided with two sensors 23, 24; the first sensor 23 is placed at the output of reactor 7, while the other sensor 24 is placed at the output of the second section 18 of the flocculation device 12. The resulting modulated current provided by the pH meter 22 is transmitted to the control pump 16 by an electrical connection 25.

The floatation device 21 is provided with horizontally-spaced electrodes 26 located under and spaced from the distributing network 20 and which surrounds it in a mass of bubbles. This mass of bubbles lifts the proteins to the surface where they form a layer 27 scraped by a scraper 28, which gathers the proteins into a collecting vat 29.

The protein-free waters are collected by a lower intake network 30 which drains them out of the treatment chain.

The proteins accumulated in the collecting vat 29 receive the emulsification agent(s) (oses) injected by the pump 37 and the tubing 38. The mix is discharged by a pump 31 into a emulsification tank 32 provided with a stirrer 40.

A pH adjustment in the solubilizing tank 32 is provided for by the injection of a base added by the duct 41.

The synchronism of pumps 31 and 37 is provided by electrical interconnection 39.

The preneutralization tank 2 operates normally at a temperature of 50° C. and the temperature decreases along the sequence of apparatuses due to natural cooling. However, the process may operate to up to 60° C. in the tank 2 and in the reactor 7, and up to 95° C. in the flocculation device 12 and in the floatation tank 21.

Downstream from the emulsification tank 32, the product is brought into the sterilizing-or pasteurizing-device 33, followed by the evaporating device 34 and the drying device 35, from where it exits in powder form through a conveyor 36. The product is obviously useful immediately at the output of the emulsification tank 32.

The two following examples show applications of the process in accordance with the invention:

EXAMPLE I

The effluents from a dairy plant manufacturing milk powder and presenting the following average features:
pH: 11.2
$BDO_5$ (Biological Demand in Oxygen during a period of five days) :960 mg/liter
CDO: 2.05 mg/liter are fed to an installation in accordance with the invention.
Stagnation time in preneutralization tank 2: 3 hours
Injected air flow: 0.3 mg $O_2$ per mg of CDO and per hour
pH at the output of the preneutralization tank 2: 10.7
Stagnation time in the reactor 7: 3 hours
Specific surface of the support material 8: 200 $m^2/m^3$ pH at the reactor output: 5.8
Calcium chloride injected at 10: 30 parts per million (ppm),
Organic co-adjuvant injected at 13: 1.5 ppm of a mix of:
sodium alginate: 80% by weight
albumin: 10%
*Ceratonia siliqua*: 8%
*Malva sylvestris*: 2%
Sulfuric acid (make-up acid) injected at 16a, 16, 17: 60 ppm
Final pH (at the output of flocculation device 12): 4.2
Floating: with dissolved air
Dephosphatation yield: 15 to 20%
Dryness of the recuperated proteins: 11%
Floated protein analysis:
  Proteins (N×6.29): 68%
  Fats: 10%
  Lactose (glucids): 6%

By adding to these recuperated products 2.7 times their dry weight of lactoserum concentrated to 50%, there is obtained after pasteurization, evaporation and drying a powder containing 36% of proteins and 47% of lactose.

EXAMPLE II

The effluents of a dairy plant manufacturing milk powder, butter oil, yogourt, and presenting the following average features:
pH: 10.8
$BDO_5$: 800 mg/l
CDO: 4,100 mg/l are fed to an installation in accordance with the invention
Stagnation time in preneutralization (tank N° 2): 5 hours
Pressurized air injection: 4.6 mg $O_2$ per mg of CDO per hour
ph at the output of the preneutralization: 9.2
Stagnation time in reactor 7: 150 minutes
Specific surface of the supporting material 8: 80 $m^2/m^3$
pH at the output of reactor 7: 5.1
Magnesium sulphate injected at 10: 40 ppm
Organic co-adjuvant injected at 13: one ppm of a mix made from:
  Gelatin: 70% by weight
  Agar-agar: 25%
  Pectin: 5%

Make-up acid injected at 17: Sulfuric acid: 40 ppm
Floating: by electrolysis
Dryness of the recuperated proteins: 9%
Floated proteins analysis:
Proteins: 52%
Fats: 33%
Lactose (glucids): 2%

The above examples are provided for illustrative purposes only and should not be considered limitative of the scope of the invention.

What I claim:

1. Process for recuperating proteins of a milk-containing liquid, comprising the following steps:
   flocculating said proteins by adding to said liquid a make-up acid and an adjuvant in amounts to maintain the liquid pH at the iso-electric pH of said proteins and to facilitate the coagulation and the floatation of said proteins;
   floating the flocculated proteins by micro-bubbles;
   recuperating the floated proteins and emulsifying the recuperated proteins by adding oses thereto;
   said adjuvant being constituted by a mineral co-adjuvant and an organic co-adjuvant separately added to the liquid, the mineral co-adjuvant being chosen from the group consisting of calcium salts, magnesium salts and mixtures thereof, and said organic adjuvant being chosen from the group consisting of alginates, pectin, albumin, gelatin, carob bean extract, mallow extract and mixtures thereof.

2. A process as defined in claim 1, in which said acid and both said co-adjuvants are added in such proportions that the final pH of the liquid, after flocculation and ready for the floating step, is about 4.2.

3. A process as defined in claim 2, in which the mineral co-adjuvant is calcium chloride added in a proportion of about 3 ppm of said liquid, and the organic co-adjuvant is a mix of 80% sodium alginates, 10% albumin, 8% *Ceratonia siliqua*, and 2% *Malva sylvestris*, the percentages expressed by weight, said make-up acid being sulphuric acid in a proportion of about 60 ppm of said liquid, *Ceratonia siliqua* being said carob bean extract and *Malva sylvestris* being said mallow extract.

4. A process as defined in claim 2, in which the mineral co-adjuvant is magnesium sulphate added in a proportion of about 40 ppm of the liquid, the organic co-adjuvant is a mix of 70% of gelatin; 25% agar-agar; and 5% of pectin, the percentages expressed by weight, agar-agar being said alginates, and the make-up acid is sulphuric acid in a proportion of about 40 ppm of said liquid.

5. A process as defined in claim 1, wherein the proteins flocculated during said flocculating step are aggregated to form a filtering bed and said liquid containing said make-up acid and said adjuvant is filtered through said bed.

6. A process as defined in claim 1, wherein said oses exclude lactose and are added to the proteins in an amount such that the ratio of the weight of total Kjeldahl nitrogen of said recuperated proteins to the weight of said added oses, is below 504x/M, where M is the average molecular weight of the added oses and x is a constant comprised between 0.6 and 1.4.

7. A process as defined in claim 6, wherein the recuperated proteins are stirred and their pH adjusted to about neutral during the emulsifying step.

8. A process as defined in claim 6, wherein the temperature of the recuperated proteins is increased during the emulsifying step.

9. A process as defined in claim 6, in which the emulsified proteins are thereafter submitted to pasteurization, to evaporation and, finally, to drying for obtaining a powder.

10. A process as defined in claim 6, in which the emulsified proteins are thereafter submitted to sterilization, to evaporation and, finally, to drying for obtaining a powder.

11. A process as defined in claim 1, wherein said oses consist of lactose and is added to the floated proteins in an amount such that the ratio of the weight of the total Kjeldahl nitrogen of said recuperated proteins to the weight of said added lactose, is 1.4, expressed as monohydrated lactose.

12. A process as claimed in claim 11, wherein the recuperated proteins are stirred and their pH adjusted to about neutral during their emulsifying step.

13. A process as in claim 1, in which, before the flocculating step, the pH of said liquid is lowered by submitting the same to a biological preneutralization in a vat by free culture of micro-organisms contained in said liquid, the latter left to stagnate in the vat between one and fifteen hours and submitted to water oxygenation at a rate of 0.01 to 0.9 mg of oxygen per mg of CDO and per hour, and that the thus-preneutralized liquid is then submitted to a biological neutralization in a reactor in which milk-compatible micro-organisms adhere to divided material presenting a developed surface comprised between 10 and 250 $m^2$ per $m^3$ of reactor, the liquid recirculated through said reactor at a speed comprised in between 1.5 and 50 m/h, the stagnation time of the liquid in said reactor comprised between 30 minutes and 8 hours.

14. A process as defined in claim 13, in which the process is continuous and further comprising the step of measuring the pH of the liquid, so as to control make-up acid intake to constantly obtain the desired pH at the flocculating step, said measure of pH being effected at the output of said reactor by a first pH-reading sensor and at the output of the flocculating step by a second pH-reading sensor.

15. A process as defined in claim 1, wherein the mineral co-adjuvant is in a proportion between 5 and 3,000 mg per liter of said liquid, and the organic co-adjuvant is in a proportion of between 0.1 and 50 mg per liter of the liquid.

* * * * *